3,038,931
SUBSTITUTED BENZHYDRYL AMINO ETHERS
AND SALTS
August Franciscus Harms, Amsterdam, Netherlands, assignor to N.V. Koninklijke Pharmaceutische Fabrieken V/H Brocades-Stheeman & Pharmacia, Meppel, Netherlands, a corporation of the Netherlands
No Drawing. Filed Apr. 25, 1956, Ser. No. 580,684
Claims priority, application Netherlands Apr. 8, 1952
8 Claims. (Cl. 260—501)

The invention relates to substituted benzhydryl amino ethers and salts and quaternary ammonium compounds thereof. This application is a continuation-in-part of my copending application Serial No. 345,837, filed March 31, 1953, now abandoned.

Medicines capable of checking or preventing travel sicknesses (air, sea and car sickness) have always been of an exceedingly great importance. Especially during the Second World War when great numbers of persons had to be conveyed over long distances, travel sickness played an important part and consequently much research work was done, especially also by the military authorities. As a result of this research work it was found that the best results were obtained with belladonna alkaloids in the form of hyoscine, atropine, hyoscyamine, preparations which formerly have already been used for this purpose (vide e.g. J. Am. Pharm. Assn., Pract. Ed. 7, 109 (1946)).

To the use of these alkaloids, however, important drawbacks attach. The substances are very toxic, so that overdosing is dangerous, while in addition there is an individual super-sensitiveness. Furthermore they show annoying by-effects, such as dryness in the mouth and disturbances in eyesight.

Important, therefore, was the discovery of Gay and Carliner (Science 109, 359 (1949)), that β-dimethyl aminoethyl benzhydrylether-8-chlorotheophylinate was effective against sea sickness. Chinn et al. (Proc. Soc. Exptl. Biol. and Med. 73, 218 (1950)), found that the β-dimethylaminoethylbenzhydrylether portion of the molecule (the antihistaminic known under the name of diphenhydramine) has the same favourable action. The antihistaminic action, therefore, seems to play a certain part in the fighting of travel sicknesses.

Now diphenhydramine, besides its antihistaminic action, also possesses other pharmacological properties, i.a. an antiacetylcholine action (atropine action). This, therefore, could explain why in the case of travel sicknesses diphenhydramine has a similar action as the above mentioned alkaloids. This explanation finds support in the fact that in the case of other diseases, such as Parkinson's disease, for which atropine was used as a medicine, diphenhydramine is also effective. A great advantage of the use of diphenhydramine for treating sea sickness etc. is that it is much less toxic than the above mentioned alkaloids and that i.a. it does not cause dryness in the mouth.

After diphenhydramine various other antihistaminics have been investigated with regard to their action against seasickness. It was found that by no means all substances having a strong antihistaminic action are suitable for preventing seasickness etc.

From these investigations the conclusion can be drawn that in general those antihistaminics are effective against travel sicknesses, which at the same time have a pronounced anti-acetylcholine (atropine) action. It has therefore been tried to increase this action of the antihistaminics by the addition of a very small amount of one of the said alkaloids.

We have now found that optically racemic and levo- optical isomers of substances of this class containing a tertiary alkylradical with 4–6 carbon atoms in the ortho position of one of the phenyl nuclei and no further substituents, while only showing a relatively weak antihistaminic action, possess a strong anti-acetylcholine (atropine) action and are very effective medicines against travel sicknesses.

The invention accordingly relates to substances of the general formula

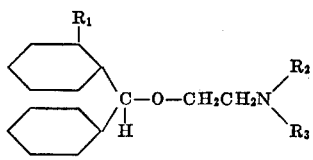

in which $R_1$ is a tertiary alkylradical containing 4–6 carbon atoms,
$R_2$ and $R_3$ are members of the class consisting of methyl and ethyl radicals.

The invention also relates to salts and quaternary ammonium compounds of said substances.

The tertiary alkyl radical containing 4–6 carbon atoms may be a tertiary butyl, a tertiary amyl or a tertiary hexyl group.

The values for the antiacetylcholine action and the antihistaminic action of compounds

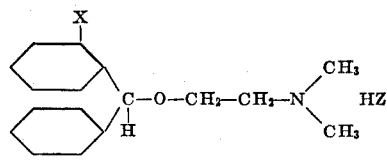

in which X represents hydrogen or various alkyl radicals and Z an acid radical are listed in the following table. Said values have been determined for the hydrochloric acid or the oxalic acid salts of the amino ethers as indicated in the second column.

| | X | HZ | Antiacetylcholine action | Antihistamine action |
|---|---|---|---|---|
| 1 | H | HCl | 1 | 1 |
| 2 | CH₃ | HCl | 3 | 0.3 |
| 3 | C₂H₅ | HCl | 3 | 0.2 |
| 4 | racemic tert.-C₄H₉ | HCl | 22.5 | 0.05 |
| 5 | racemic tert.-C₅H₁₁ | ox. | 11.5 | 0.07 |

The table shows that the compounds in which the ortho substituted alkyl radical is a tertiary alkyl radical have a substantially higher antiacetylcholine action than the known compounds with a lower ortho substituted alkyl radical and that among the compounds with a tertiary alkyl radical those with a tertiary butyl group have outstanding properties.

The compounds according to the invention also possess a strong local anesthetic action. The racemic tertiary butyl compound e.g. has a local anesthetic action, determined on the rabbit cornea, which is about 30 times as high as that of novocaine and 1.5 times as high as that of cocaine.

The novel substances which form the object of the invention may be obtained by all methods known for the manufacture of the corresponding unsubstituted amino ethers. A preferred method consists in that a substance of the general formula

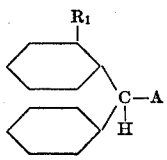

is heated with a substance of the general formula

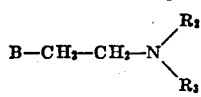

in which one of the symbols A and B is halogen and the other of said symbols O-metal, preferably O-alkalimetal.

The compounds according to the invention may also be obtained by heating a substance of the general formula

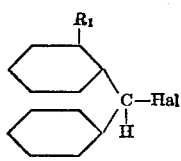

in which Hal represents a halogen atom with a substance of the general formula

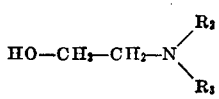

In this case the reaction may be carried out by using an excess of the second component, the amino alcohol, or by adding another acid binding substance. A particularly favourable yield may be obtained if the amino alcohol is used in an equimolecular proportion and the reaction is effected by heating the components in a polar solvent, as described in Dutch Patent 71,895.

The desired compounds can also be obtained by heating, preferably in the presence of a solvent, a compound of the general formula

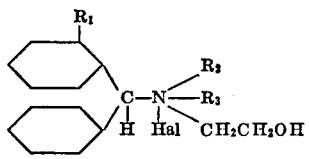

which compound may be obtained by reacting the corresponding substituted benzhydryl halogenide with the corresponding N dialkyl substituted aminoethanol at a temperature below 50° C.

It is also possible in the processes indicated above to start from a component which instead of the substituted amino group contains a halogen atom and after effecting the condensation to replace this halogen atom in known manner by a substituted amino group. In this case first a compound of the formula

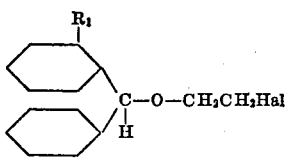

is obtained in which the halogen atom is subsequently replaced by the group

The compounds according to the invention are generally used in the form of salts, e.g. with inorganic or organic acids, such as the hydrochloric acid, hydrobromic acid, oxalic acid or tartaric acid salts.

The compounds according to the invention contain an asymmetric carbon atom. When prepared by any of the above mentioned processes they are obtained in the form of racemates. I have found that the levo optical isomers of these products show even a higher anti-acetyl-choline action. According to the invention such optically active products are produced by resolution of the racemic products in any of the conventional ways, e.g. by recrystallization of the salts of the free base with an optically active acid such as tartaric acid.

The invention will be illustrated by the following examples.

Example 1

A mixture of 0.1 mol (25.9 grams) of o-t-butyl-benzhydrychloride (melting point=86.5–87.5° C.) and 0.22 mol (19.6 grams) of beta-dimethyl amino ethanol is slowly heated with agitation until the mixture becomes turbid (about 120° C.). After another 10 minutes' heating at a temperature ranging between 120 and 150° C. the reaction mixture is cooled, agitated with about 100 milliliters of $H_2O$ and subjected to an extraction with ether, whereupon the layer of ether is dried with anhydrous sodium sulphate and fractionated. 28.0 grams of an ortho-t-butyl-benzhydryl-dimethylaminoethylether (Number 4 of the table) were obtained. This substance has a boiling point of 193° C./8 m. and a melting point of 69–70.5° C. The yield is about 90%.

In order to obtain the hydrochloric acid salt the free base is dissolved in about 500 milliliters of ether and the theoretical amount of 2 N alcoholic hydrochloric acid is added in drops with stirring. The hydrochloric acid salt is once recrystallized from ethanol-ether. It has a melting point of 179–180° C. The yield is 26 grams (83%).

In the same manner the following compounds included in the table for purposes of comparison were prepared:

o - Methylbenzhydryl - dimethylaminoethylether.HCl, melting point 154–156° C., boiling point of the base 190° C./12 m. (Number 2 of the table);

o - Ethyl - benzhydryl - dimethylaminoethylether.HCl, melting point 116–117° C., boiling point of the base 172–175° C./2 m. (Number 3 of the table).

When the hydrochloric acid salt appeared to be hygroscopic the acid oxalate was prepared by reacting equimolecular amounts of the etheric solution of the base and the acid. Thus I prepared:

o-t-Amylbenzhydryl-dimethylaminoethylether.Ox., melting point 124–128° C. (Number 5 of the table).

Example 2

200 milliliters of ortho-dichlorobenzene are heated to boiling, whereupon in about one hour a mixture of 1 mol (259 grams) of o-t-butylbenzhydrylchloride and 89 grams of dimethylaminoethanol is added. Boiling is continued for another thirty minutes, whereupon the reaction mixture is cooled for twelve hours in a refrigerator. A crystalline mass is formed which is separated from the mixture by filtering. The crystals are washed with ether and subsequently recrystallized from a mixture of ethylacetate and alcohol. Thus a crystalline product having a melting point of 179–180° C. is obtained in a yield of 70%.

Example 3

Equimolar amounts of the o-t-butyl-benzhydryl-dimethylaminoethylether (free base) and d-tartaric acid are heated for thirty minutes to about 60° C. in ethanol. If subsequently ether is added an oil will separate out which after seeding becomes solid. This product is separated and recrystallized from ethanol-ether; it is the levo-optical component. From the mother liquor the dextro optical component can be isolated. The following values are determined for the racemic mixture and for the levo optical rotatory and the dextro-optical components:

The melting point.

The specific rotation (in water).

The antiacetylcholine activity as compared with that of the corresponding unsubstituted compound (=1).

Said values are listed in the following table.

| d-tartaric acid salt | Melting point, ° C. | Specific rotation in water | Antiacetylcholine activity |
| --- | --- | --- | --- |
| racemic | 106–108 | +6.25 | 22.5 |
| levo-optical | 122–123 | −23.6 | 42.0 |
| dextro-optical | 131–132 | +36.5 | 0.5 |

I also prepared the hydrochloric acid salt of the levo-rotatory component by the addition of the theoretical amount of hydrochloric acid in ethanol to the free 1 base which was obtained from the levo-rotatory tartrate, dissolved in ether and dried. This hydrochloric acid salt also showed an antiacetylcholine activity of 42.0.

I claim:
1. A compound of the class consisting of amino ethers of the general formula

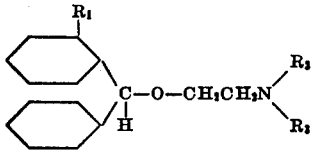

in which
R₁ is a tertiary alkyl radical selected from the group consisting of a tertiary butyl radical, a tertiary amyl radical and a tertiary hexyl radical,
R₂ and R₃ are members of the class consisting of methyl and ethyl radicals,
in the racemic form, the same amino ethers in the levo-optical form, and the non-toxic acid-addition salts of said amino ethers.

2. The racemic ortho-tert.butyl benzhydryl ether of dimethylamino ethanol.

3. Non-toxic inorganic acid-addition salts of the racemic ortho-tert.butyl benzhydryl ether of dimethylamino ethanol.

4. The hydrochloric acid salt of the racemic ortho-tert. butyl benzhydryl ether of dimethylamino ethanol.

5. Nontoxic organic acid-addition salts of the racemic ortho-tert.butyl benzhydryl ether of dimethylamino ethanol.

6. The tartaric acid salt of the racemic ortho-tert.butyl benzhydryl ether of dimethylamino ethanol.

7. The levo optical ortho-tert.butyl benzhydryl ether of dimethylamino ethanol.

8. The hydrochloric acid salt of the levo optical ortho-tert.butyl benzhydryl ether of dimethylamino ethanol.

References Cited in the file of this patent

UNITED STATES PATENTS

| | | |
|---|---|---|
| 2,397,799 | Martin et al. | Apr. 2, 1948 |
| 2,454,092 | Rieveschl | Nov. 16, 1948 |
| 2,483,434 | Rieveschl | Oct. 4, 1949 |
| 2,508,422 | Rieveschl | May 23, 1950 |
| 2,534,813 | Cusic | Dec. 19, 1950 |
| 2,567,350 | Rieveschl | Sept. 11, 1951 |
| 2,567,351 | Rieveschl | Sept. 11, 1951 |
| 2,577,234 | Cusic | Dec. 4, 1951 |

FOREIGN PATENTS

| | | |
|---|---|---|
| 952,948 | France | May 16, 1949 |
| 743,495 | Great Britain | Jan. 18, 1956 |

OTHER REFERENCES

Harms et al.: Receuil des Travaux Chimiques des Pays-Bas, vol. 71, pages 431-2 (1952).

Wishnefsky: Antihistamines, Industry and Product Survey (1950), page 67.

Prusak: J.O.P.S., vol. 35, No. 9, pages 616–626.